United States Patent
Higurashi

[11] Patent Number: 6,031,679
[45] Date of Patent: Feb. 29, 2000

[54] MAGNETIC RECORDING/REPRODUCING APPARATUS CAPABLE OF REPRODUCING DIGITAL DATA AT MINIMUM ERROR RATE

[75] Inventor: Seiji Higurashi, Tokyo, Japan

[73] Assignee: Victor Company of Japan, Ltd., Yokohama, Japan

[21] Appl. No.: 08/961,919

[22] Filed: Oct. 31, 1997

[30] Foreign Application Priority Data

Nov. 27, 1996 [JP] Japan ................................. 8-316418
Nov. 28, 1996 [JP] Japan ................................. 8-317480

[51] Int. Cl.[7] .................................................. G11B 15/467
[52] U.S. Cl. .............................. 360/73.06; 360/70; 386/67
[58] Field of Search .............................. 360/73.06, 73.04, 360/73.05, 64, 69, 70, 71; 386/67

[56] References Cited

U.S. PATENT DOCUMENTS

| 5,359,471 | 10/1994 | Hasegawa | 360/73.05 X |
| 5,444,575 | 8/1995 | Augenbraun et al. | 360/70 X |
| 5,576,907 | 11/1996 | Hasegawa | 360/64 |
| 5,687,037 | 11/1997 | Jung | 360/73.06 X |

FOREIGN PATENT DOCUMENTS

| 0259195 | 3/1988 | European Pat. Off. . |
| 0632438 | 1/1995 | European Pat. Off. . |
| 3722577 | 1/1988 | Germany . |
| 618047 | 3/1994 | Japan . |
| 6325305 | 11/1994 | Japan . |
| 8111050 | 4/1996 | Japan . |
| 8111059 | 4/1996 | Japan . |

Primary Examiner—Aristotelis M. Psitos
Assistant Examiner—James L Habermehl
Attorney, Agent, or Firm—Pollock, Vande Sande & Amernick

[57] ABSTRACT

A magnetic recording/reproduction apparatus is provided which is designed to record and reproduce digital information signals on and from a magnetic tape at a reduced error rate in a long play mode. When the long play mode is entered, the travel speed of the magnetic tape is changed to $1/(2n)$ (n=a natural number) times that in a normal play mode, and the rotational speed of a rotary drum is changed to $(2n+1)/(2n)$ times that in the normal play mode. Tracks are written on the magnetic tape with alternate helical scans of a pair of rotary heads, one every $(2n+1)/2$ rotations of the rotary drum to record the digital information signals on the tracks. In an alternative form of the invention, digital information signals are recorded on the magnetic tape in the long play mode using a third rotary head and one of the pair of the rotary heads. The third rotary head is mounted on the rotary drum at a given angular interval away from the one of the pair of the rotary heads in a height relation which allows tracks to be written on the magnetic tape in the long play mode at the same track pitch as that in the normal play mode.

4 Claims, 9 Drawing Sheets

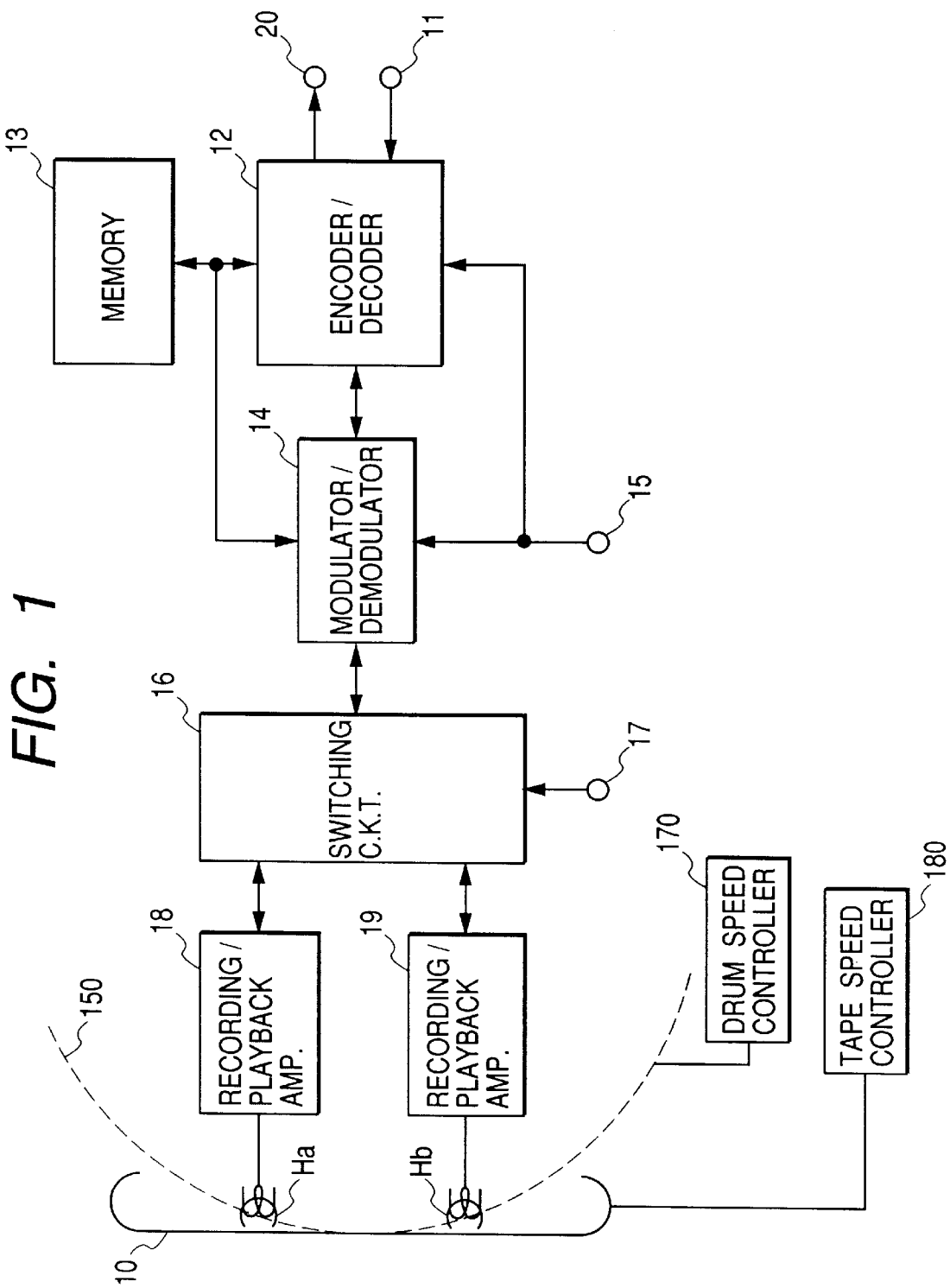

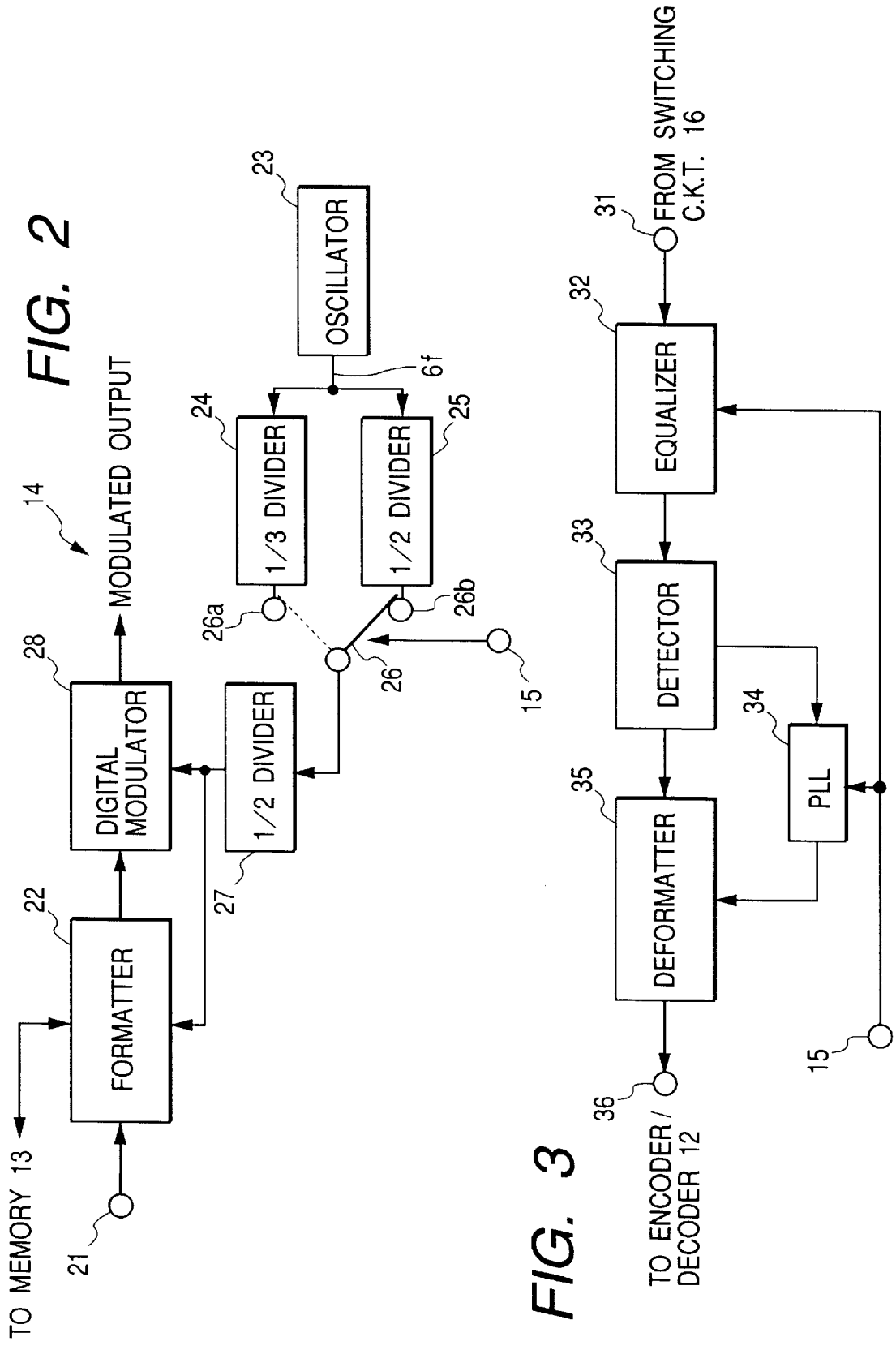

MAGNETIC RECORDING/REPRODUCING APPARATUS CAPABLE OF REPRODUCING DIGITAL DATA AT MINIMUM ERROR RATE

BACKGROUND OF THE INVENTION

1. Technical Field of the Invention

The present invention relates generally to a magnetic recording/reproduction apparatus, and more particularly to an improved structure of a magnetic recording/reproduction apparatus designed to record and reproduce digital information on and from a magnetic tape for an extended period of time at a reduced error rate.

2. Background of Related Art

A helical scan magnetic recording/reproduction apparatus is known in the art which is designed to record and reproduce information signals on and from a magnetic tape which is wrapped helically about a rotary drum over a 180° angular range and is moving at a constant speed using two magnetic heads installed on the rotary drum 180° apart from each other. This type of magnetic recording/reproduction apparatus usually uses two magnetic heads to write recording tracks close to each other at different azimuth angles without a guard band or with a considerably narrow guard band for improving the packing density.

Japanese Patent Second Publication No. 6-18047 teaches a helical scan magnetic recording/reproduction system designed to record digital information on a magnetic tape traveling at a speed of one-third of a normal recording speed using a rotary drum (head) spinning (rotating) at the same speed as that in a normal recording three times a normal recording time. The rotary drum has mounted thereon two rotary heads which are diametrically opposed and show different azimuth angles. The rotary heads alternately write slant tracks on the magnetic tape, one every 1.5 rotation of the rotary drum. This achieves azimuth recording for an extended period of time that is an odd multiple of a normal recording time.

In the above system, if only the tape travel speed is changed to half that in the normal recording mode in order to achieve recording for an extended period of time that is an even multiple of the normal recording time, an information signal is recorded on the magnetic tape one time every rotation of the rotary drum. Specifically, the recording of the information signal is achieved by only one of the two rotary heads, thereby resulting in the same azimuth angle in all tracks. This makes it impossible to achieve reproduction utilizing the azimuth loss effect. In order to avoid this problem, a two-channel recording is known which uses an additional rotary head for recording for an extended period of time that is an even multiple of the normal recording time. Additionally, Japanese Patent First Publication No. 6-325305 teaches the use of an additional head for intermittent recording at an azimuth angle which is different from that of one of normal heads.

The recording of data at a recording data rate that is half that in a normal recording mode can also be accomplished at a rotational speed of a rotary drum and a travel speed of a magnetic tape which are half those in the normal recording mode, respectively. In this case, the reproduction is achieved by setting the rotational speed of the rotary drum equal to that in the normal recording mode and the travel speed of the magnetic tape to half that in the normal recording mode.

Accordingly, the two-channel recording/reproduction requires two separate systems: a recording system (a modulator, a recording amplifier, and etc.) and a reproduction system (a ereproduction amplifier, an equalizer, a phase lock loop for data clock playback, and etc.), thus resulting in an increase in production cost.

Further, the odd multiple time recording can be achieved by two rotary heads that are diametrically opposed at the same level, however, the even multiple time recording requires double azimuth heads which show different azimuth angles and which are mounted at different height levels, instead of one of the rotary heads used in the odd multiple recording. This results in complex height adjustment of the rotary heads and an increase in production cost.

The digital data recorders can usually record data of about 14 Mbps for five hours in a normal play mode. However, even 7-Mbps data recording requires addition of dummy data to the original to change the data rate to about 14 Mbps. It is, thus, difficult to prolong a recording time of five hours further. The conventional recording/reproduction system designed to record digital information on a magnetic tape traveling at a speed that is half that in a normal recording mode, wrapped around a rotary drum spinning at a rotational speed that is also half in the normal recording mode and to establish digital reproduction at the rotary drum speed equal to that in the normal recording mode and the tape travel speed that is half that in the normal recording mode, can achieve an about ten-hour recording when the recording data rate is 7 Mbps. In this system, however, scan paths of the rotary heads during reproduction are undesirably shifted from tracks written on the magnetic tape, thereby leading to deterioration in error rate of reproduced data.

SUMMARY OF THE INVENTION

It is therefore a principal object of the present invention to avoid the disadvantages of the prior art.

It is another object of the present invention to provide a magnetic recording/reproduction system capable of recording and reproducing digital information on and from a magnetic tape for an extended period of time at a reduced error rate.

According to one aspect of the present invention, there is provided a magnetic recording apparatus which comprises: (a) a rotary drum having disposed thereon a pair of rotary heads which are diametrically opposed to each other; (b) a tape speed controller controlling a travel speed of the magnetic tape wrapped helically around the rotary drum to a preselected speed in a normal play mode, the tape speed controller changing the travel speed of the magnetic tape to 1/(2n) (n=a natural number) times that in the normal play mode when a long play mode is entered; (c) a drum speed controller controlling a rotational speed of the rotary drum to a preselected speed in the normal play mode, the drum speed controller changing the rotational speed of the rotary drum to (2n+1)/(2n) times that in the normal play mode when the long play mode is entered; and (d) a recording circuit writing tracks on the magnetic tape with alternate scans of the magnetic heads to record digital information signals on the tracks in the normal play mode, the recording circuit writing tracks on the magnetic tape with alternate scans of the magnetic heads, one every (2n+1)/2 rotations of the rotary drum to record digital information signals on the tracks in the long play mode.

According to another aspect of the invention, there is provided a magnetic recording/reproduction apparatus which comprises: (a) a rotary drum having disposed thereon a pair of rotary heads which are diametrically opposed to each other; (b) a tape speed controller controlling a travel speed of the magnetic tape wrapped helically around the rotary drum to a preselected speed in a normal play mode, the tape speed controller changing the travel speed of the magnetic tape to 1/(2n) (n=a natural number) times that in the normal play mode when a long play mode is entered; (c) a drum speed controller controlling a rotational speed of the rotary drum to a preselected speed in the normal play mode, the drum speed controller changing the rotational speed of the rotary drum to (2n+1)/(2n) times that in the normal play mode when the long play mode is entered; (d) a modulating circuit converting a frequency of input digital information signals to (2n+1)/(2n) times to produce modulated digital information signals; (e) a recording circuit writing tracks on the magnetic tape with alternate scans of the magnetic heads to record the input digital information signals on the tracks in the normal play mode, the recording circuit writing tracks on the magnetic tape with alternate scans of the magnetic heads, one every (2n+1)/2 rotations of the rotary drum to record the modulated digital information signals on the tracks in the long play mode; and (f) a reproducing circuit decoding using a first frequency characteristic the digital information signals recorded in the normal play mode, reproduced by the rotary heads, the reproducing circuit also decoding using a second frequency characteristic the digital information signals recorded in the long play mode, reproduced by the rotary heads.

In the preferred mode of the invention, the reproducing circuit includes a demodulating circuit demodulating the reproduced digital information signals and a decoding circuit decoding outputs of the demodulating circuit using a memory. The demodulating circuit includes an equalizer and a phase lock loop extracting clocks from an output of the equalizer. The equalizer and the phase lock loop have characteristics both changed in the normal and long play modes.

According to a third aspect of the present invention, there is provided a magnetic recording/reproduction apparatus which comprises: (a) a rotary drum having disposed thereon a pair of rotary heads which are diametrically opposed to each other; (b) a tape speed controller controlling a travel speed of the magnetic tape wrapped helically around the rotary drum to a preselected speed in a normal play mode, the tape speed controller changing the travel speed of the magnetic tape to 1/(2n) (n=a natural number) times that in the normal play mode when a long play mode is entered; (c) a drum speed controller controlling a rotational speed of the rotary drum to a preselected speed in the normal play mode, the drum speed controller changing the rotational speed of the rotary drum to (2n+1)/(2n) times that in the normal play mode when a recording operation in the long play mode is activated, while controlling the rotational speed of the rotary drum to the same speed as that in the normal play mode when a playback operation in the long play mode is activated; (d) a recording circuit writing tracks on the magnetic tape with alternate scans of the magnetic heads to record input digital information signals on the tracks in the normal play mode, the recording circuit writing tracks on the magnetic tape with alternate scans of the magnetic heads, one every (2n+1)/2 rotations of the rotary drum to record input digital information signals on the tracks in the long play mode; and (e) a reproducing circuit reproducing the digital information signals recorded on the magnetic tape using the rotary heads to decode them.

According to a fourth aspect of the invention, there is provided a magnetic recording apparatus which comprises: (a) a rotary drum; (b) first and second rotary heads disposed on the rotary drum at an angular interval of 180° away from each other, the first and second rotary heads having azimuth angles different from each other and writing tracks with alternate helical scans thereof on a magnetic tape traveling at a preselected speed, wrapped around the rotary drum to record digital information signals on the tracks in a normal play mode; (c) a third rotary head disposed on the rotary drum at an angular interval of θ(θ≠180°) following the first rotary head in a direction of rotation of the rotary drum, the third rotary head having an azimuth angle different from that of the first rotary head; and (d) a recording circuit, when a long play mode is entered, changing a travel speed of the magnetic speed to 1/2m times (m=a natural number) that in the normal play mode to write tracks with alternate helical scans of the first and third rotary heads on the magnetic tape wrapped around the rotary drum spinning at the same speed as that in the normal play mode to record digital information signals on the tracks for a period of time of 2m times a recording time in the normal play mode.

In the preferred mode of the invention, the first and second rotary heads having a relative height difference h, as shown below, from a preselected a reference plane $$h = Tp - \frac{v}{v_S}\left(\frac{\theta}{180} + 2n - 2\right) \cdot Tp$$

where Tp is a track pitch in the normal play mode, $v_S$ is the travel speed of the magnetic tape in the normal play mode, v is the travel speed of the magnetic tape in the long play mode, and n is a natural number indicating the number of rotations of the rotary drum until both the first and third rotary heads start to write the tracks on the magnetic tape.

According to a fifth aspect of the invention, there is provided a magnetic recording/reproduction apparatus which comprises: (a) a rotary drum; (b) first and second rotary heads disposed on the rotary drum at an angular interval of 180° away from each other, having azimuth angles different from each other, the first and second rotary heads recording and reproducing digital information signals with alternate scans on and from a magnetic tape traveling at a preselected speed, wrapped around the rotary drum spinning at a preselected rotational speed in a normal play mode; (c) a third rotary head disposed on the rotary drum at an angular interval of θ(θ≠180°) following the first rotary head in a direction of rotation of the rotary drum, the third rotary head having an azimuth angle different from that of the first rotary head; (d) a recording circuit, when a long play mode is entered, changing a travel speed of the magnetic speed to 1/2m times (m=a natural number) that in the normal play mode to write tracks with alternate helical scans of the first and third rotary heads on the magnetic tape wrapped around the rotary drum spinning at the same speed as that in the normal play mode to record digital information signals on the tracks for a period of time of 2m times a recording time in the normal play mode; and (e) a reproducing circuit, when the long play mode is entered, changing the travel speed of the magnetic speed to 1/2m times (m=a natural number) that in the normal play mode to reproduce the digital information signals recorded on the magnetic tape with alternate helical scans of the first and third rotary heads of the rotary drum spinning at the same speed as that in the normal play mode for the period of time of 2m times a reproducing time in the normal play mode.

In the preferred mode of the invention, the first and second rotary heads having a relative height difference h, as shown below, from a preselected a reference plane $$h = Tp - \frac{v}{v_S}\left(\frac{\theta}{180} + 2n - 2\right) \cdot Tp$$

where Tp is a track pitch in the normal play mode, $v_S$ is the travel speed of the magnetic tape in the normal play mode, v is the travel speed of the magnetic tape in the long play mode, and n is a natural number indicating the number of rotations of the rotary drum until both the first and third rotary heads start to write the tracks on the magnetic tape.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 1 is a block diagram which shows a magnetic recording/reproduction apparatus according to the first embodiment of the invention;

FIG. 2 is a block diagram which shows a modulating circuit of a modulator/demodulator used in the magnetic recording/reproduction apparatus in FIG. 1;

FIG. 3 is a block diagram which shows a demodulating circuit of a modulator/demodulator used in the magnetic recording/reproduction apparatus in FIG. 1;

DESCRIPTION OF THE PREFERRED EMBODIMENTS

Figure 4:
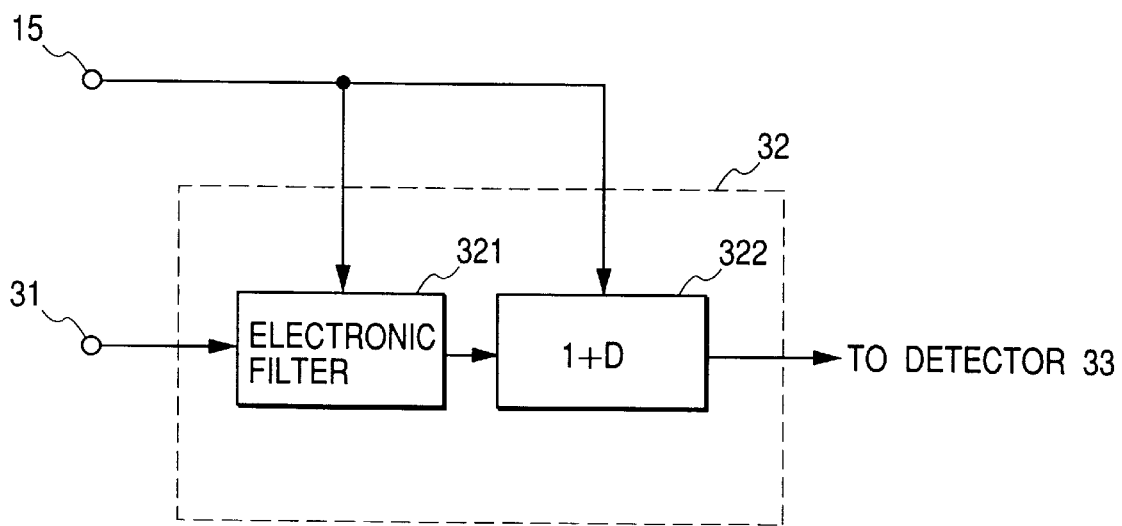
FIG. 4 is a block diagram which shows a variable equalizer used in the demodulating circuit in FIG. 3.

Referring now to the drawings, wherein like numbers refer to like parts in several views, particularly to FIG. 1, there is shown a magnetic recording/reproduction apparatus according to the first embodiment of the invention.

The magnetic recording/reproduction apparatus includes a rotary drum 150 of a conventional cylindrical structure which has a pair of rotary magnetic heads Ha and Hb disposed in the bottom thereof. The rotary heads Ha and Hb projects partly from the periphery of the rotary drum 150 and are located at the same height level from a reference line, as taught in U.S. Pat. No. 4,633,332 issued on Dec. 30, 1986, assigned to the same assignee as that of this application, the contents of which are incorporated herein by reference. The rotary heads Ha and Hb are illustrated as being arranged in parallel to a magnetic tape 10 for convenience, but in practice, diametrically opposed to each other and show first and second azimuth angles. The magnetic tape 10 is wrapped around a 180° peripheral area of the rotary drum 150 and travels at a constant speed through a nip (pinch) provided by a capstan and a pinchroller (not shown).

The rotary drum 150 is, as will be discussed later in detail, controlled selectively in a normal play mode (also called a standard play mode) and a long play mode. In the long play mode, the rotary drum 150 is controlled so as to spin (rotate) at a speed of 1.5 times that in the normal play mode, and the magnetic tape 10 is moved at a speed of ½ of that in the normal play mode.

Assuming that the rotary heads Ha and Hb record and reproduce one slant track on and from the magnetic tape 10 alternately every ⅟60 sec. in the normal play mode, the rotational speed of the rotary drum 150 will be 30 rps. Thus, in the long play mode, the rotary drum 150 is controlled so as to spin at 45 rps that is 1.5 times 30 rps. This speed control is achieved by a drum speed controller 170. The drum speed controller 170 includes a frequency generator which provides a motor speed signal having a frequency proportional to the speed of a drum motor (not shown) for the rotary drum 150 and a pickup head (not shown) which provides one pulse every rotation of the rotary drum 150 to produce a drum speed signal of a frequency of 45 Hz. The drum speed signal is frequency-converted into a signal having a frequency of 15 Hz that is ⅓ of 45 Hz which is, in turn, compared with a signal of 15 Hz produced by frequency-dividing a vertical synchronizing signal of, for example, 60 Hz by four during recording and with a reference signal of 15 Hz from an oscillator during reproduction to produce a phase error signal for phase control of the drum motor.

The adjustment of travel speed of the magnetic tape 10 is achieved by controlling, for example, the speed and phase of a capstan motor through a tape speed controller 180. The speed control of the capstan motor is accomplished based on a sensor signal having a frequency proportional to a rotational speed of the capstan motor. The phase control of the capstan motor is implemented based on a phase error signal derived by a phase comparison of a rotational sensor signal of the capstan motor with an output of an oscillator during recording and a playback control signal read out of the magnetic tape 10 during reproduction. Although not illustrated in FIG. 1, a control pulse is recorded cyclically on the magnetic tape 10 using a control head during a recording mode of operation and reproduced during a playback mode of operation.

In the recording mode of operation, a digital information signal entering an input terminal 11 is first stored in a memory 13 through an encoder/decoder 12 and then transmitted to an encoding circuit of the encoder/decoder 12 wherein it is interleaved and error-corrected, after which they are stored in the memory 13 again as encoded data.

The digital information signal consists of, for example, a main data code and an auxiliary data code termed a pack. The pack is a fixed length data code consisting of auxiliary information on a cassette ID, a time code, a recording time, source information (e.g., a channel and a program index number when digital broadcasting signals are recorded), text data (e.g., a title and a summary for each recorded program) and identification information on the auxiliary information.

The encoded data stored in the memory 13 is read out in response to a clock signal produced by a modulator/demodulator 14 and then modulated in a modulating circuit of the modulator/demodulator 14. The modulating circuit includes, as shown in FIG. 2, a formatter 22, a digital modulator 28, a ½ divider 27, a ⅓ divider 24, a ½ divider 25, a switch 26, and an oscillator 23.

The formatter 22 adds information such as a synchronizing signal to the encoded data read out of the memory 13 to produce a data code in a given signal format consisting of the encoded data and a signal inputted from the encoding circuit of the encoder/decoder 12 through a terminal 21.

The oscillator 23 outputs clock pulses at a frequency 6 f that is six times a clock signal frequency f in the normal play mode to the ⅓ and ½ dividers 24 and 25, respectively. The ⅓ divider 24 produces clock pulses of a frequency 2 f of one-third that of the input clock pulses. The ½ divider 25 produces clock pulses of a frequency 3 f of half that of the input clock pulses. The switch 26 is responsive to a play mode ID signal inputted from a terminal 15 specifyg the normal play mode or the long play mode to selectively establish communication between the ½ divider 27 and a terminal 26a connected to the ⅓ divider 24 or between the ½ divider 27 and a terminal 26b connected to the ½ divider 25. Specifically, in the normal play mode, the clock pulses of the frequency 2 f are transmitted from the ⅓ divider 24 to the ½ divider 27, while in the long play mode, the clock pulses of the frequency 3 f are transmitted from the ½ divider 25 t the ½ divider 27.

The ½ divider 27 frequency-converts the clock pulses having the frequencies 2 f and 3 f inputted from the ⅓ and ½ dividers 24 and 25 into clock pulses of frequencies 1.5 f and f, respectively, which are, in turn, inputted to the formatter 22 and the digital modulator 28. Specifically, in the normal play mode, the clock pulses of the frequency f are inputted to the formatter 22 and the digital modulator 28, while in the long play mode, clock pulses of the frequency 1.5 f are inputted to the formatter 22 and the digital modulator 28.

The digital modulator 28 modulates the digital information signal outputted from the formatter 22 at a data rate determined by the input clock pulses. Specifically, in the long play mode, the digital modulator 28 outputs the digital information signal modulated at a data rate that is 1.5 times that in the normal play mode to a switching circuit 16, as shown in FIG. 1.

The switching circuit 16 provides the input digital information signal to a recording/playback amplifier 18 and a recording/playback amplifier 19 alternately in response to a head switching pulse appearing at the terminal 17 which is produced in a known manner in synchronization with the phase of rotation of the rotary drum 150. Specifically, the digital information signal is outputted from the switching circuit 16 to the recording/playback amplifier 18 or 19 connected to one of the rotary heads Ha and Hb now scanning the magnetic tape 10 and then power-amplified therein. Each of the rotary heads Ha and Hb writes a slant track on the magnetic tape 10 and records thereon the input digital information signal every preselected angular rotation of the rotary drum 150. Each slant track consists of a plurality of fixed data areas (i.e., data blocks) each termed a sync block written by a scan of one of the rotary heads Ha and Hb.

In the long play mode, the rotary drum 150 is, as described above, rotated at a speed of 1.5 times that in the normal play mode, while the magnetic tape 10 travels at a speed of half that in the normal play mode. The switching circuit 17 provides the digital information signal to the rotary heads Ha and Hb alternately through the recording/playback amplifiers 18 and 19 every one rotation and a half of the rotary drum 150 for a period of time during which the rotary drum 150 spins 180°. For example, when the rotary head Ha first records the digital information signal on the magnetic tape 10 over a ½ rotation of the rotary drum 150, the rotary head Hb scans the magnetic tape 10 without recording a signal until completion of one subsequent rotation of the rotary drum 150 and then starts to write a subsequent slant track on the magnetic tape 10 to record the digital information signal thereon over a ½ rotation of the rotary drum 150. In this manner, slant tracks are written in sequence by the rotary heads Ha and Hb on the magnetic tape 10 at angular intervals of 540° (i.e., every 1.5 rotations of the rotary drum 150).

Therefore, in the long play mode, the slant tracks are formed by the rotary heads Ha and Hb on the magnetic tape 10 at the same pitches as those in the normal play mode so that adjacent two of the slant tracks are arranged at different azimuth angles. The magnetic tape 10 is, as described above, controlled so as to travel at a speed of ½ of normal play speed, thereby achieving recording for an extended period of time that is twice that in the normal play mode only using the two rotary heads Ha and Hb without the need for double azimuth heads or two-channel recording heads. This allows data of, for example, close to 7 Mbps to be recorded for ten hours on a magnetic tape capable of storage of data of close to 14 Mbps for five hours in the normal play mode.

In a playback operation in the long play mode, the rotary drum 150 is, similar to the recording operation, so as to spin at a speed of 1.5 times that in the normal play mode. Similarly, the magnetic tape 10 is also controlled so as to travel at a speed of ½ of that in the normal play mode. The rotary heads Ha and Hb travel alternately along scanning paths coincident with the slant tracks written on the magnetic tape 10 to pick up the digital information signals and output them to the recording/playback amplifiers 18 and 19 through rotary transformers (not shown). The recording/playback amplifiers 18 and 19 amply the input digital information signals and supply them to the switching circuit 16.

The switching circuit 16 is responsive to the head switching pulse appearing at the terminal 17 to establish communication of the modulator/demodulator 14 and one of the recording/playback amplifiers 18 and 19 connected to the rotary head Ha or Hb now scanning the magnetic tape 10. Specifically, the switching circuit 16 provides the input digital information signals outputted from the recording/playback amplifiers 18 and 19 alternately to the modulator/demodulator 14. The modulator/demodulator 14 demodulates the input digital information signals through a demodulating circuit, as shown in FIG. 3.

The demodulating circuit includes a deformatter 35, a detector 33, a variable equalizer 32, and a phase lock loop (PLL) 34.

The reproduced digital information signals entering a terminal 31 are transmitted to the variable equalizer 32 and undergo a given equalization operation. Since the data rate is different between the long play mode and the normal play mode, characteristics of the variable equalizer 32 and the PLL 34 are changed in response to the play mode ID signal inputted to the terminal 15.

Figure 5:
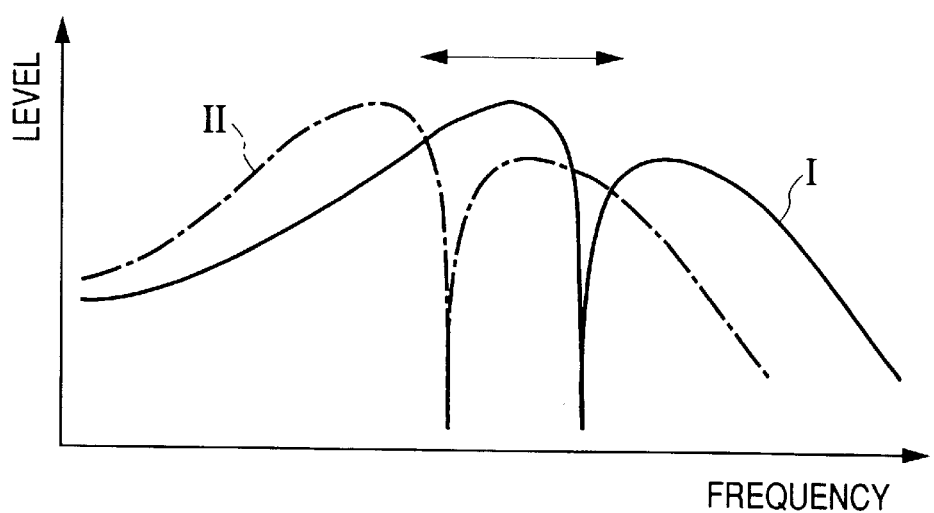
FIG. 5 is a graph which shows a frequency characteristic of the variable equalizer in FIG. 4.

The variable equalizer 32 includes an electronic filter having a voltage-controlled characteristic which has been put into general use in recent years. FIG. 4 shows the structure of the variable equalizer 32 which includes an electronic filter 321 and a delay/adder circuit 322 designed to perform a (1+D) partial response function. The electronic filter 321 is responsive to the play mode ID signal appearing at the terminal 15 to change frequency characteristics thereof The delay/adder circuit 322 uses a voltage-controlled delay line to change the amount of delay D thereof. FIG. 5 shows the frequency characteristics of the variable equalizer 32. When the long play mode is entered, the variable equalizer 32 switches the frequency characteristics from II, as indicated by a broken line, to I, as indicated by a solid line, since the playback data rate in the long play mode is 1.5 times that in the normal play mode.

The digital information signals reproduced in an analog form, outputted from the variable equalizer 32 are transmitted to the detector 33 shown in FIG. 3 and converted into digital signals which are, in turn, inputted to the PLL 34 and the deformatter 35. The PLL 34 is designed to change the central frequency of an output waveform of an internal voltage-controlled oscillator in response to the play mode ID signal inputted to the terminal 15 and extracts clock signal components from the input digital signals to provide them to the deformatter 35. The deformatter 35 demodulates the digital signals inputted from the detector 33 based on the clock signal components from the PLL 34 to produce the original digital information which is, in turn, supplied to the memory 13 through the terminal 36.

Referring back to FIG. 1, the digital information stored in the memory 13 is inputted to the decoding circuit of the encoder/decoder 12 wherein it undergoes deinterleaving and error correction and is decoded to produce the original digital signals which are, in turn, outputted from the output terminal 20. In the long play mode, each of the slant tracks on the magnetic tape 10 is scanned two times by corresponding one of the rotary heads Ha and Hb so that two digital signals are reproduced from each of the slant tracks. It is, thus, advisable to select one of the two digital signals reproduced from each of the slant tracks which shows a better error rate.

While in the above embodiment, the recording and playback times in the long play mode are twice those in the normal play mode, the magnetic recording/reproduction apparatus of the invention is capable of recording and reproduction for a period of time that is 2n (n=a natural number) times that in the normal play mode. In this case, the tape travel speed is controlled to 1/(2n) times that in the normal play mode, while the rotational speed of the rotary drum 150 is increased to (2n+1)/(2n) times that in the normal play mode so that the rotary heads Ha and Hb record and reproduce the slant tracks on and from the magnetic tape 10 alternately every (2n+1)/2 rotations of the rotary drum 150.

The magnetic recording/reproduction apparatus according to the second embodiment will be discussed below which is different from the first embodiment only in that in the playback operation in the long play mode, the rotary drum 150 is rotated at the same speed as that in the normal play mode, and the magnetic tape is moved at a speed of half that in the normal play mode. Structural arrangements in recording and playback systems are substantially identical, and explanation thereof in detail will be omitted here.

Figure 6:
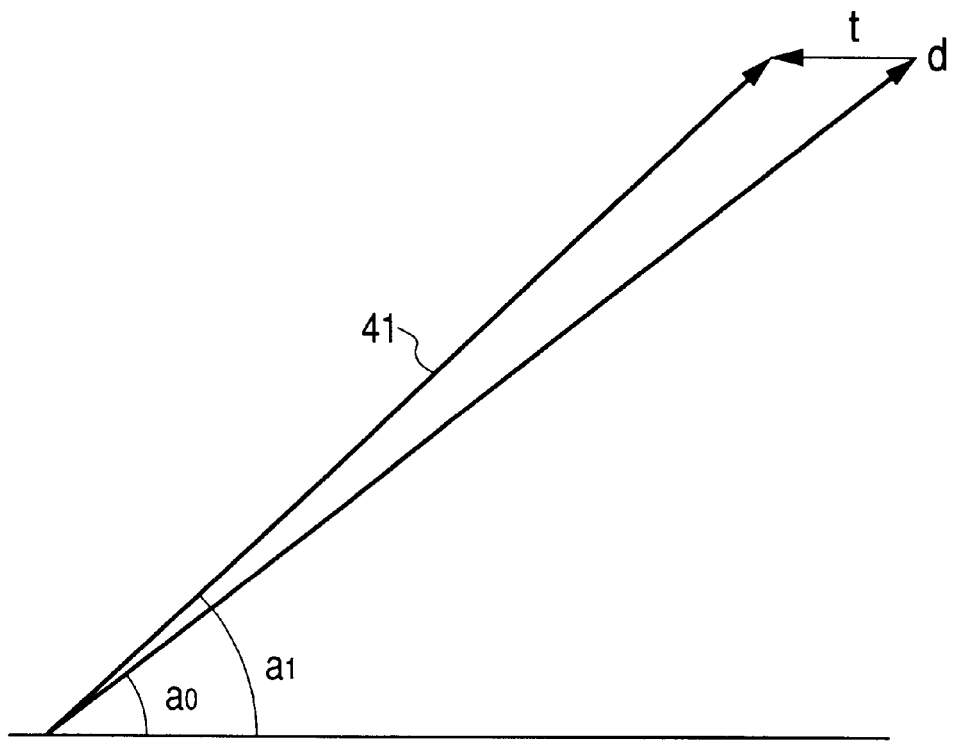
FIG. 6 is a view which shows a track angle in a normal play mode.

If, in FIG. 6, a head scan angle (i.e., a still angle) which a scan path of each of the rotary heads Ha and Hb makes with a longitudinal line of the magnetic tape 10 which is stationary (i.e., in a still mode) is defined as $a_0$, a scan vector of each of the rotary heads Ha and Hb in the still mode is defined as d, and a tape travel vector in the normal play mode is defined as t, a scan vector of each of the rotary heads Ha and Hb in the normal play mode is expressed by a line 41, and a track angle is expressed by $a_1$.

Figure 7:
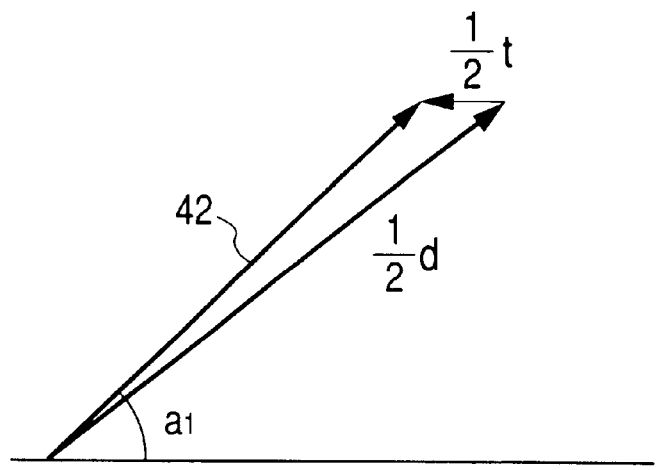
FIG. 7 is a view which shows a track angle when a rotary drum speed and a tape travel speed are half those in a normal play mode, respectively.

A conventional system designed to achieve a two-time longer recording at a drum speed and a tape travel speed that are half those in the normal play mode is, as described above, known in the art. If, in FIG. 7, a scan vector of a rotary head in the still mode is defined as ($\frac{1}{2}$)d, and a tape travel vector at a speed of half that in athe normal play mode is defined as ($\frac{1}{2}$)t, a scan vector of the rotary head when a rotational speed of a rotary drum and a tape travel speed are both controlled to be half those in the normal play mode is expressed by a line 42. In this case, a track angle will be $a_1$ identical with that in the normal play mode.

Figure 8:
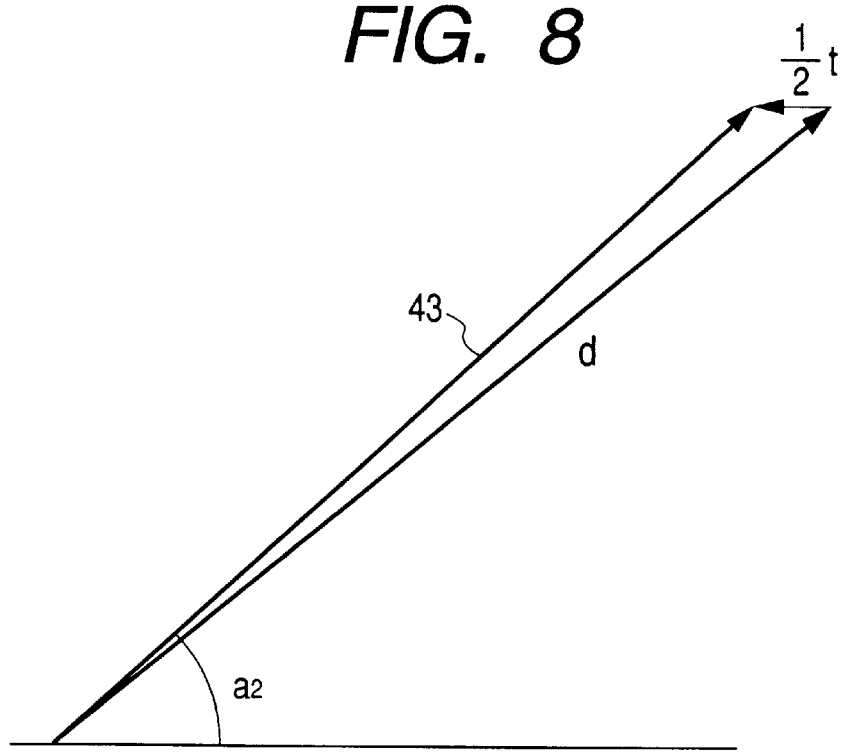
FIG. 8 is a view which shows a track angle when a rotary drum speed is the same as that in a normal play mode, and a tape travel speed is half that in the normal play mode.

In FIG. 8, a scan vector of the rotary head when the rotational speed of the rotary drum is the same as that in the normal play mode, and the tape travel speed is half that in the normal play mode is shown by a line 43, and the track angle will be $a_2$. Note that d indicates a scan vector of the rotary head in the still mode, and ($\frac{1}{2}$)t indicates a tape travel vector at a speed of half that in the normal play mode.

In the conventional system designed to achieve a two-time longer play mode, the rotational speed of the rotary drum and the tape travel speed during recording are, as described above, controlled to be half those in the normal play mode, while during playback, only the tape travel speed is changed to half that in the normal play mode without changing the rotational speed of the rotary drum. Specifically, a head-to-tape speed during playback is different from that during recording, thus resulting in a shift between a scan path of the rotary head during playback and a track recorded on the magnetic tape, which corresponds to a difference between the track angle $a_1$ during recording in FIG. 7 and the track angle $a_2$ during playback in FIG. 8.

A better error rate is achieved as the track angle during playback approaches $a_1$. Usually, the track angle is decreased as the tape travel speed is decreased if the rotational speed of the rotary drum is increased.

The magnetic recording/reproduction apparatus of this embodiment is, as described above, designed to change the tape travel speed during playback in the long play mode to $\frac{1}{2}$ of that in the normal play mode without changing the rotary drum speed so that the track angle will be $a_2$ in FIG. 8. During recording in the long play mode, unlike the above described conventional system, the recording is made every 1.5 rotations of the rotary drum 150 at the drum rotational speed of 1.5 times that in the normal play mode and at the tape travel speed of $\frac{1}{2}$ of that in the normal play mode. A scan vector and track angle are, thus, expressed by a line 44 and $a_3$ in FIG. 9, respectively. Note that 1.5d indicates a scan vector of the rotary heads Ha and Hb in the still mode, and ($\frac{1}{2}$)t indicates a tape travel vector at a speed of $\frac{1}{2}$ of that in the normal play mode.

Figure 9:
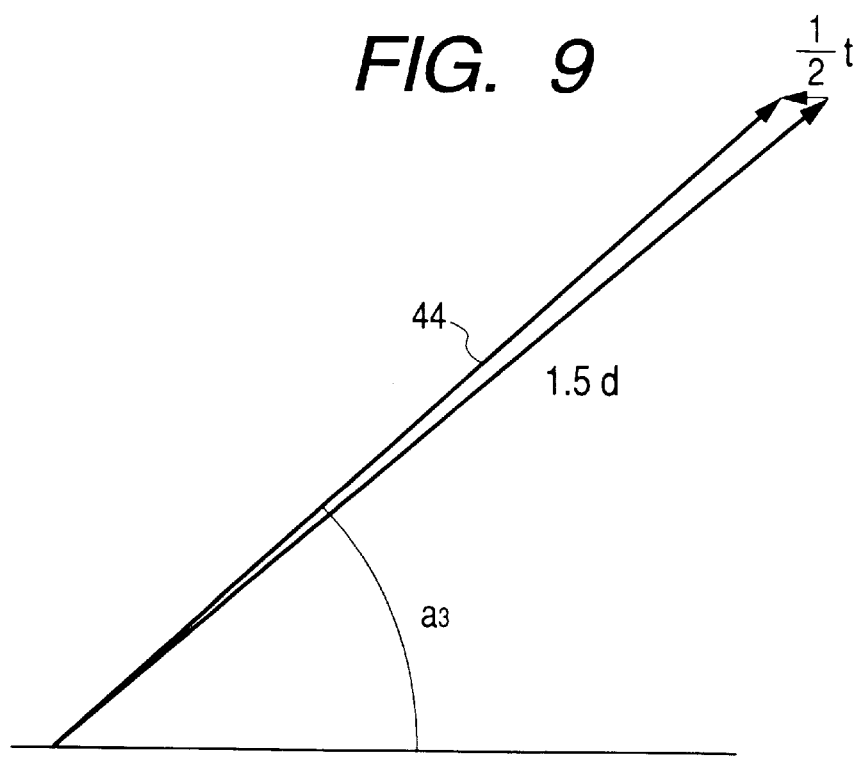
FIG. 9 is a view which shows a track angle when a rotary drum speed is 1.5 times that in a normal play mode, and a tape travel speed is half that in the normal play mode.

Therefore, in the magnetic recording/reproduction apparatus of this embodiment, a head-to-tape speed during playback in the long play mode is different from that during recording, thus resulting in a shift between a recorded track and a scan path of each of the rotary heads Ha and Hb during playback, which corresponds to a difference between the track angle $a_3$ during playback in FIG. 9 and the track angle $a_2$ during recording in FIG. 8, but a track angle difference $(a_2-a_3)$ is smaller than a track angle difference $(a_1-a_2)$ in the above conventional system, thereby resulting in an improved error rate.

The above track angle difference further affects on the frequency of a reproduced signal. Specifically, as the track angle difference becomes smaller, the frequency of the reproduced signal approaches that of a recorded signal. Thus, this embodiment also has the advantage in this regard as compared with the conventional system.

Figure 10:
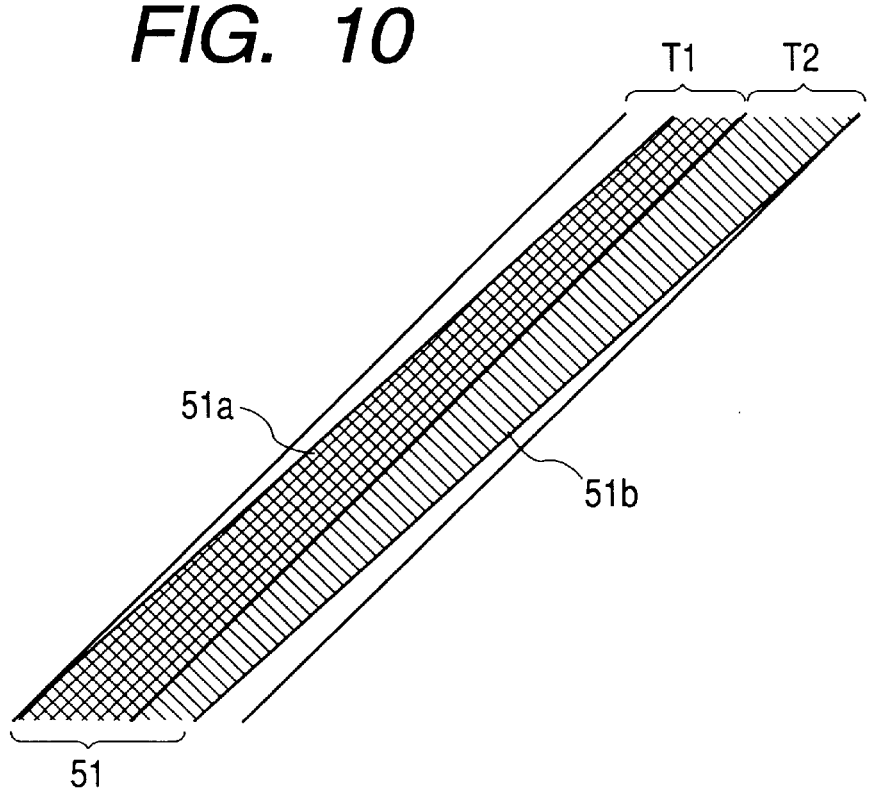
FIG. 10 is a view which shows the relation between a scan path of one of two rotary heads and tracks in a conventional system when a rotary drum speed and a tape travel speed are half those in a normal play mode, respectively.
Figure 11:
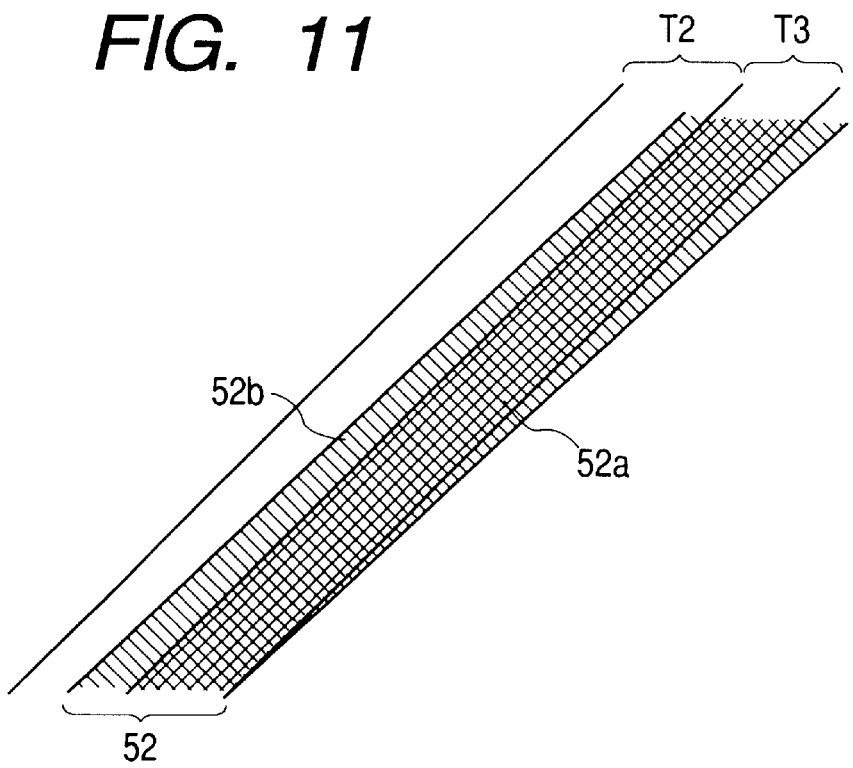
FIG. 11 is a view which shows the relation between a scan path of the other rotary head and tracks in the conventional system in FIG. 10.

FIGS. 10 and 11 show the relation between tracks T1, T2, and T3 recorded on a magnetic tape in the conventional system when a rotational speed of a rotary drum, and a travel speed of the magnetic tape are ½ of those in the normal play mode, respectively, and scan paths of rotary heads during playback when the rotational speed of the rotary drum is equal to that in the normal play mode, and the travel speed of the magnetic tape is ½ of that in the normal play mode. When one of the two rotary heads having a track width of 1.5 times that of each track moves, as shown in FIG. 10, along a scan path 51, a signal is reproduced from only one of two scanned areas 51a and 51b (e.g., the scanned area 51a) on the track T1 which has the same azimuth angle as that of the one of the rotary heads. When the other rotary head moves along a scan path 52, as shown in FIG. 11, a signal is reproduced from one of two scanned areas 52a and 52b (e.g., the scanned area 52a) on the track T3 which has the same azimuth angle as that of the other rotary head.

Figure 12:
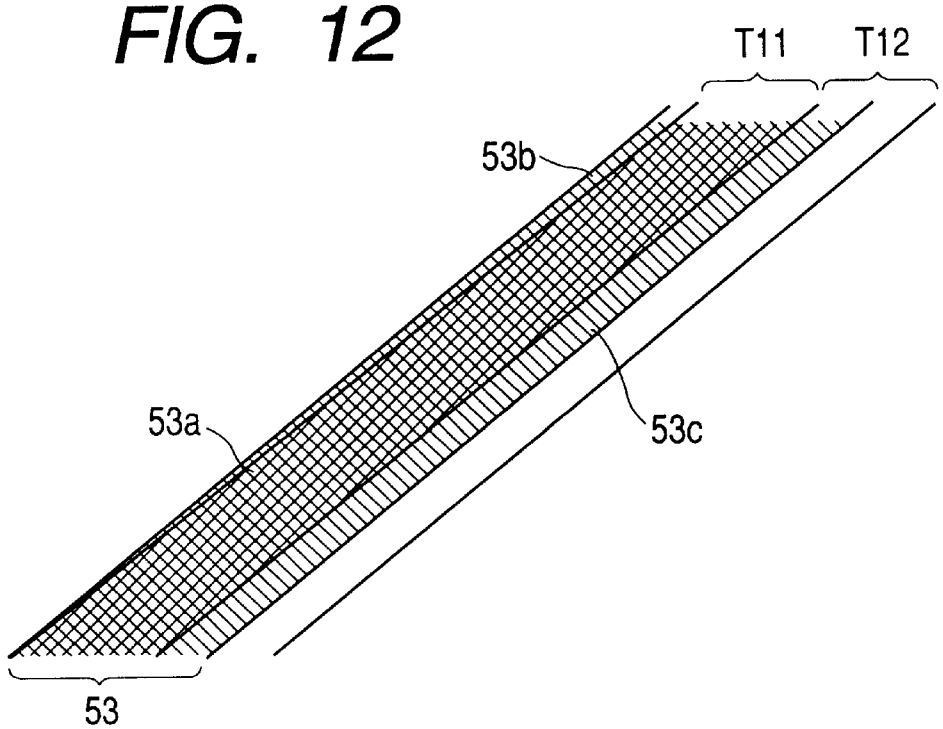
FIG. 12 is a view which shows the relation between a scan path of one of two rotary heads and tracks in the second embodiment of the invention when a rotary drum speed is 1.5 times that in a normal play mode, and a tape travel speed is half that in the normal play mode.
Figure 13:
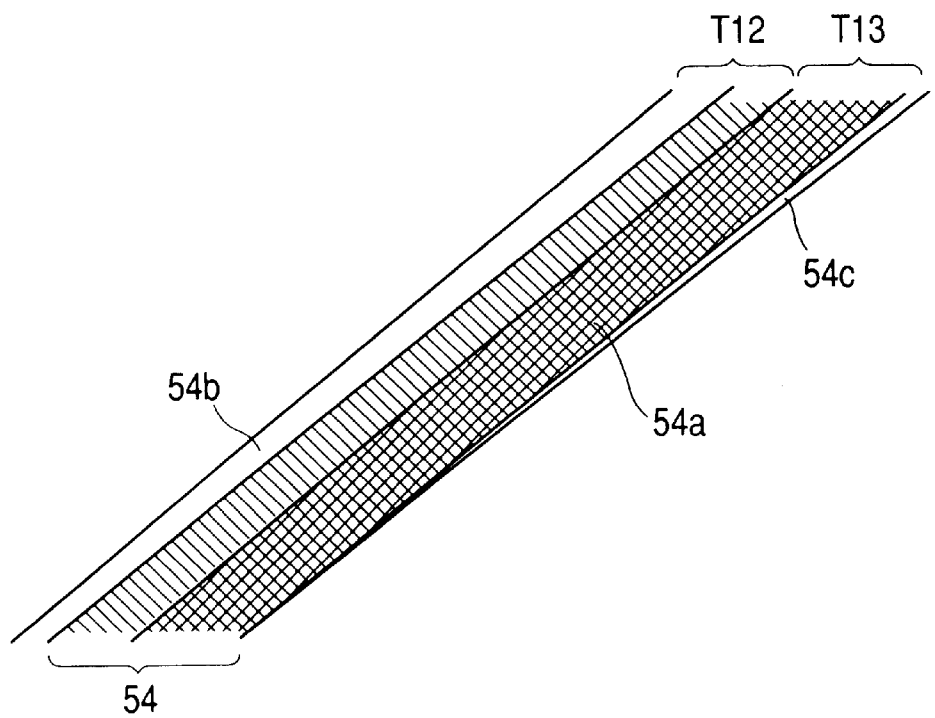
FIG. 13 is a view which shows the relation between a scan path of the other rotary head and tracks in the second embodiment of the invention as shown in FIG. 12.

FIGS. 12 and 13 show the relation between tracks T11, T12, and T13 recorded on the magnetic tape 10 in the magnetic recording/reproduction apparatus of the second embodiment when a rotational speed of the rotary drum 150 is 1.5 times that in the normal play mode, and a travel speed of the magnetic tape 10 is ½ of that in the normal play mode and scan paths of the rotary heads Ha and Hb during playback when the rotational speed of the rotary drum 150 is equal to that in the normal play mode, and the travel speed of the magnetic tape 10 is ½ of that in the normal play mode. When one of the two rotary heads Ha and Hb having a track width of 1.5 times that of each track moves, as shown in FIG. 12, along a scan path 53, a signal is reproduced from only one of three scanned areas 53a to 53c (e.g., the scanned area 53a) on the track T11 which has the same azimuth angle as that of the one of the rotary heads Ha and Hb. When the other rotary head moves along a scan path 54, as shown in FIG. 13, a signal is reproduced from only one of three scanned areas 54 to 54c (e.g., the scanned area 54a) on the track T13 which has the same azimuth angle as that of the other rotary head.

The comparison between FIGS. 10 and 11 and FIGS. 12 and 13 shows that a total area on the recorded tracks occupied by the scan paths in the magnetic recording/reproduction apparatus of this embodiment, as shown in FIGS. 12 and 13, is greater than that in the conventional system, as shown in FIGS. 10 and 11. Specifically, high-quality signals are reproduced by the magnetic recording/reproduction apparatus of this embodiment as compared with the conventional system.

As discussed above, the magnetic recording/reproduction apparatus of the second embodiment is designed to perform the recording operation in the long play mode every 1.5 rotations of the rotary drum 150 at a drum rotational speed of 1.5 times that in the normal play mode and at a tape travel speed of ½ of that in the normal play mode and to perform the playback operation at a drum rotational speed identical with that in the normal play mode and at a tape travel speed of ½ of that in the normal play mode. Thus, the scan paths of the rotary heads Ha and Hb during playback are, as mentioned above, shifted from the recorded tracks, but it is, as can be seen in FIGS. 12 and 13, possible to reproduce signals with higher quality than the conventional system. The magnetic recording/reproduction apparatus of this embodiment eliminates the need for an equalizing function in the demodulating circuit and switching of the central frequency of an output of the voltage-controlled oscillator in the PLL 34. Specifically, the same modulating circuit structure as that used in the normal play mode may be used in the long play mode, thus resulting in a decrease in manufacturing cost.

While the recording and playback times in the long play mode in the second embodiment are explained as being twice those in the normal play mode, the magnetic recording/reproduction apparatus of this embodiment is capable of recording and reproduction for a period of time that is 2n (n=a natural number) times that in the normal play mode. In this case, the tape travel speed during recording is controlled to 1/(2n) times that in the normal play mode, while the rotational speed of the rotary drum 150 is increased to (2n+1)/(2n) times that in the normal play mode so that the rotary heads Ha and Hb record slant tracks on the magnetic tape 10 alternately every (2n+1)/2 rotation of the rotary drum 150. In the playback operation, the rotational speed of the rotary drum 150 is the same as that in the normal play mode, while the tape travel speed is changed to 1/(2n) of that in the normal play mode.

Figure 14:
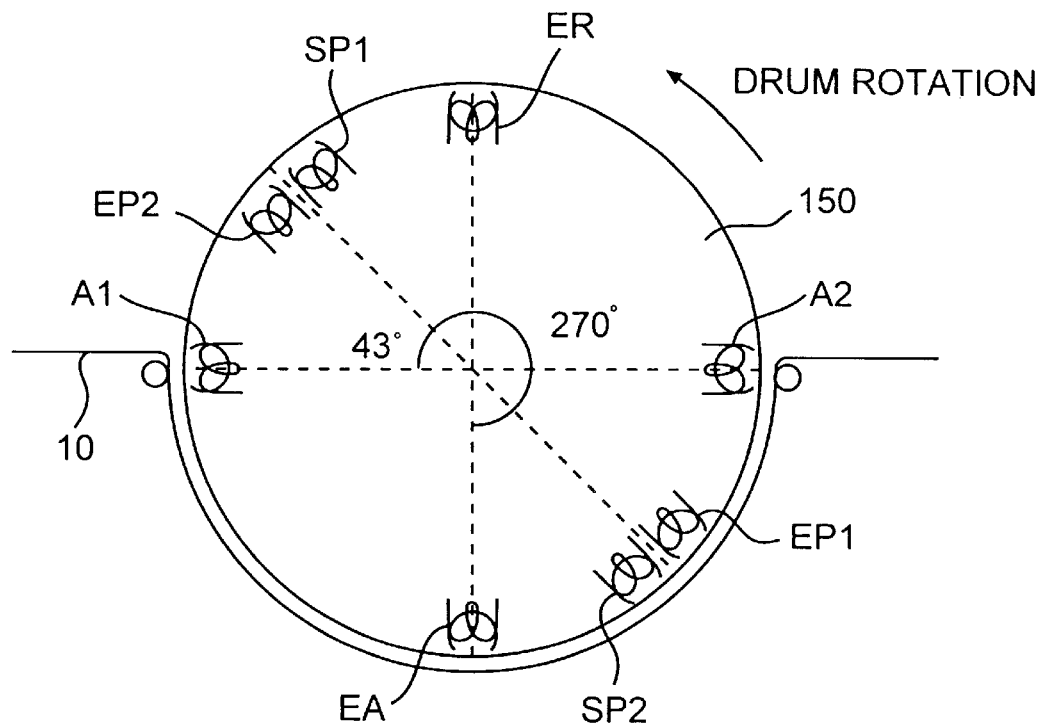
FIG. 14 is a view which shows a head layout of a rotary drum used in a magnetic recording/reproduction apparatus according to the third embodiment of the invention.

FIG. 14 shows a head layout used in a magnetic recording/reproduction apparatus according to the third embodiment of the invention.

The rotary drum 150 has mounted in the bottom thereof video signal rotary heads (referred to as video heads below) SP1, SP2, EP1, and EP2, audio signal rotary heads (referred to as audio heads below) A1 and A2, a flying-erase head ER, and an extra audio head EA.

The video heads SP1 and SP2 are used in a normal play mode and have a track width of 58 $\mu$m, for example. The video head SP1 has an azimuth angle of 6° which a head gap makes with a widthwise direction of the track in a clockwise direction (referred to as an azimuth angle of +6° hereinafter). The video head SP2 has an azimuth angle of 6° which a head gap makes with a widthwise direction of the track in a counterclockwise direction (referred to as an azimuth angle of −6°. The video heads SP1 and SP2 are, as clearly shown in the drawing, diametrically opposed to each other at the same level from a reference plane (e.g., a plane perpendicular to an axis of rotation of the rotary drum 150 or a reference line taught in U.S. Pat. No. 4,633,332 as discussed above).

The video heads EP2 and EP1 form double azimuth head assemblies for the EP mode in combination with the video heads SP1 and SP2, respectively, and have a track width of close to 19 $\mu$m. The video head EP2 has an azimuth angle of −6°. The video head EP1 has an azimuth angle of +6°. The video heads EP1 and EP2 are, as clearly shown in the drawing, diametrically opposed to each other and precede the video heads SP1 and SP2 in a rotational direction of the rotary drum 150.

The first audio head A1 is disposed on the rotary drum 150 at an angular interval of 43° away from the double azimuth head assembly consisting of the video heads SP1 and EP2 in the rotational direction of the rotary head 150. The first audio head A1 has a track width of 32 μm and an azimuth angle of +30°. The second audio head A2 is disposed on the rotary drum 150 at the same level as that of the first audio head A1 and at an angular interval of 180° away from the first audio head A1. The second audio head A2 has a track width of 32 μm and an azimuth angle of -30°. The flying-erase head ER is arranged at an angular interval of 90° away from the second audio head A2 in the rotational direction of the rotary drum 150.

The head layout described so far is already used in known helical-scan VHS VTRs. This embodiment features the layout, as will be discussed below in detail, of the extra audio head EA which is disposed at an angular interval of 270° away from the first audio head A1 in the reverse direction to rotation of the rotary drum 150 and which has a track width of 32 μm that is identical with that of the first audio head A1, but has an azimuth angle of -30° that is different from that of the first audio head A1.

The magnetic tape 150 is, as clearly shown in FIG. 14, wrapped helically around the periphery of the rotary drum 150 over 180° and moved by a nip between a capstan and a pinchroller. In a recording operation in the normal play mode, a standard color video signal in the NTSC format, for example, is divided into a luminance signal and a carrier chrominance signal. The luminance signal is frequency-modulated. The carrier chrominance signal is also frequency-modulated so as to fall within a frequency band lower than that of the frequency-modulated luminance signal. The frequency-modulated luminance signal and carrier chrominance signal are further frequency-division multiplexed and then recorded by writing video tracks on an outer layer of the magnetic tape 10 with alternate scans of the video heads SP1 and SP2. A frequency-modulated audio signal is recorded by writing audio tracks on a deeper layer of the magnetic tape 10 with alternate scans of the audio heads A1 and A2 prior to recording of the video tracks. Specifically, the video tracks are formed above the audio tracks. In a playback operation, the video and audio signals are reproduced by the video heads SP1 and SP2 and the audio heads A1 and A2 in the same manner as that in the recording operation.

In a recording operation in a three-time longer play mode (referred to as an extended play mode below), the video heads EP1 and EP2 are used instead of the video heads SP1 and SP2 to write video tracks at track pitches of close to 19 μm on the magnetic tape 10 traveling at a speed of ⅓ of that in the normal play mode. The audio heads A1 and A2 are used to write audio tracks on the magnetic tape at track pitches of close to 19 μm. This permits a record time three times longer than that in the normal play mode. In a playback operation, the video and audio signals are reproduced by the video heads EP1 and EP2 and the audio heads A1 and A2 in the same manner as that in the recording operation.

When digital data such as audio digital signals and/or video digital signals is recorded in a digital normal play mode, digital data tracks are written on the magnetic tape 10 at track pitches of 29 μm only using the audio heads A1 and A2 as digital data recording heads. In the digital normal play mode, the rotary drum 150 is moved at, for example, 30 rps which is identical with that in the video signal recording and reproduction operations as described above, and the magnetic tape 10 travels at, for example, 16.67 mm/s which is half that in the video signal recording and reproduction operations in the normal play mode.

This embodiment features the digital data recording for a period of time twice longer than that in the digital normal play mode. In this two-time longer play mode (referred to as a digital long play mode below), the rotary drum 150 is rotated at 30 rps that is identical with that in the video signal recording and reproduction operations as described above, and the magnetic tape 10 is moved at 8.34 mm/s that is half that during the digital data recording in the digital normal play mode. Digital data is recorded and reproduced using the audio head A1 and the extra audio head EA as digital data rotary heads.

The speed control of the rotary drum 150 in the digital long play mode is achieved by a drum speed controller 170 like the one shown in FIG. 1. The drum speed controller 170 includes, as already described, the frequency generator and the pickup head. For example, when the pickup head monitors the rotational speed of the rotary drum 150 spinning at 30 rps and produces a pulse signal at a frequency of 60 Hz, the drum speed controller 170 frequency-divides the pulse signal by two to produce a drum speed signal of 30 Hz and compares it with a signal of 30 Hz produced by frequency-dividing a vertical synchronizing signal of, for example, 60 Hz by two during recording and with a reference signal of 30 Hz from the oscillator built in the drum speed controller 170 during reproduction to produce a phase error signal for phase control of the drum motor.

The adjustment of travel speed of the magnetic tape 10 is achieved by controlling, for example, the speed and phase of a capstan motor through a tape speed controller 180 like the one shown in FIG. 1. The speed control of the capstan motor is accomplished based on a sensor signal having a frequency proportional to a rotational speed of the capstan motor. The phase control of the capstan motor is implemented based on a phase error signal derived by a phase comparison of a rotational sensor signal of the capstan motor with an output of the oscillator built in the tape speed controller 180 during recording and a playback control signal read out of the magnetic tape 10 during reproduction. Although not illustrated in FIG. 1, a control pulse is recorded cyclically on the magnetic tape 10 using a control head during a recording mode of operation and reproduced during a playback mode of operation.

Figure 15:
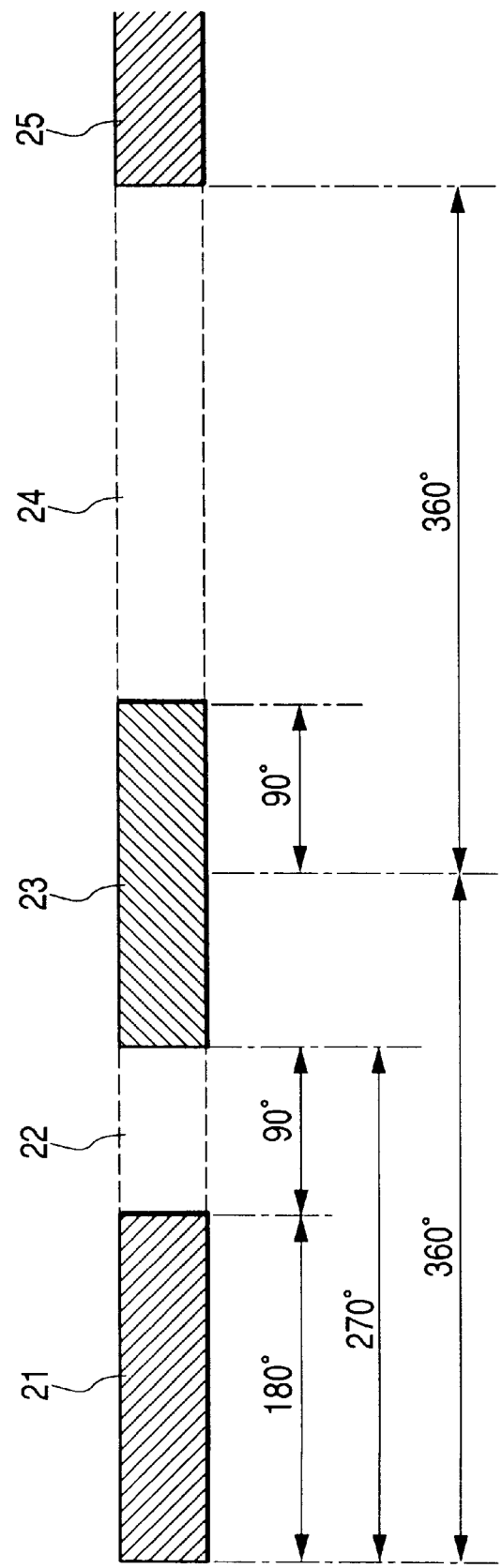
FIG. 15 is a view which shows tracks written by an audio head A1 and an extra audio head EA shown in FIG. 14.

In a digital data recording operation in the digital long play mode, the first audio head A1 scans over a 180° angular area of the rotary drum 150 to write a first track 21, as show,n in FIG. 15, on the magnetic tape 10 to record digital data therein. During the recording of the first track 21, no signals are provided to all the heads other than the first audio head A1.

Thus, no signal is recorded on the magnetic tape 10, as illustrated at numeral 22 in FIG. 15, until the rotary drum 150 rotates 90° after completion of a scan of the first audio head A1 on the magnetic tape 10. Upon reaching a scan start position on the magnetic tape 10, the extra audio head EA writes a second track 23 over a 180° rotation of the rotary drum 150 to record the digital data thereon. During the recording of the second track 23, no signals are provided to all the heads other than the extra audio head EA.

Upon completion of the scan of the extra audio head EA on the magnetic tape 10, the flying-erase head ER starts to scan the magnetic tape 10. When the rotary drum 150 rotates 270° after completion of formation of the second track 23, the first audio head A1 reaches the scan start position on the magnetic tape 10 again.

Until the first audio head A1 reaches the scan start position after the completion of formation of the second track 23, the flying-erase head ER, the second audio head A2, and the video heads EP1 and EP2 all scan the magnetic tape 10, but no signals are supplied thereto so that the digital data is not recorded, as illustrated at numeral 24 in FIG. 15.

Upon reaching the scan start position again, the first audio head A1 scans the magnetic tape 10 over a 180° rotation of the rotary drum 150 to write a third track 25 to record the digital data thereon.

The above head scanning operation is repeated to form a plurality of digital data-recorded tracks, two every two rotations of the rotary drum 150, on the magnetic tape 10 traveling at a speed of ½ of that in the digital normal play mode with alternate scans of the first audio head A1 and the extra audio head EA. The first audio head A1 and the extra audio head EA have, as described above, the azimuth angles different from each other so that adjacent two of the digital data-recorded tracks are oriented at the different azimuth angles.

The manner wherein a track pitch of digital data-recorded tracks formed in the digital long play mode is matched with that of digital data-recorded tracks formed in the digital normal play mode will be described below.

If a height difference between a lower end of the extra audio head EA and a lower end of the first audio head A1 writing a track preceding one written by the extra audio head EA is defined as h, a track pitch of two tracks formed on the magnetic tape 10 traveling at a speed $v_S$ during a complete rotation of the rotary drum 150 in the digital normal play mode is defined as Tp, an angular interval between the first audio head A1 and the extra audio head EA used in the digital long play mode wherein the magnetic tape travels at a speed v is defined as $\theta(\theta \neq 180°)$, and the rotary drum 150 rotates n times (n=a natural number) until both the first audio head A1 and the extra audio head EA start recording, the height difference h required for writing tracks at the track pitch Tp in the digital long play mode may be determined in the following manner.

The track pitch Tp of adjacent tracks formed in the digital normal play mode by the audio heads A1 and A2 which are located at an angular interval of 180° corresponds to a 180° rotation of the rotary drum 150. Thus, if tracks are formed in the digital normal play mode using two heads disposed at an angular interval $\theta$ away from each other and at the same height, a resultant track pitch Hs during a drum rotation of $\theta$ is expressed as follow:

$$Hs = Tp\,(\theta/180) \qquad (1)$$

The relation between the track pitch Hs in the digital normal play mode wherein the magnetic tape 10 travels at the speed v and the track pitch H of adjacent tracks formed during the drum rotation of $\theta$ in the digital long play mode wherein the magnetic tape 10 travels at the speed $v_S$ is $$H = Hs\,(v/v_S) \qquad (2)$$

By substituting Eq. (1) into Eq. (2), we obtain $$H = (v/v_S)\cdot Tp\,(\theta/180) \qquad (3)$$

If a following or second track begins to be formed in the digital long play mode when the rotary drum 150 has rotated n times (n=a natural number), then a resultant track pitch Hn is given by the following equation.

$$Hn = (v/v_S)\cdot Tp\,(360n/180) \qquad (4)$$
$$= (v/v_S)\cdot Tp\cdot 2n$$

Thus, if a second track begins to be formed in the digital long play mode when the rotary drum 150 has rotated n times plus $\theta$, then the track pitch H is $$H = (v/v_S)\cdot Tp\{(\theta + 360n)/180\} \qquad (5)$$

If $0 \leq \theta \leq 360$, then a second track begins to be formed during a first rotation of the rotary drum 150. Thus, a value of (360n/180) in Eq. (5) will be zero (0). Specifically, Eq. (5) may be corrected as follows:

$$H = (v/v_S)\cdot Tp\{(\theta + 360(n-1))/180\} \qquad (6)$$

If the track pitch H is less than the track pitch Tp due to a difference in tape travel speed between the digital normal play mode and the digital long play mode, the track pitch Tp is expressed by the sum of H and the height difference h between the lower end of the extra audio head EA and the lower end of the first audio head A1 as follows:

$$Tp = H + h \qquad (7)$$

By substituting Eq. (6) into Eq. (7), we obtain $$h = Tp - \frac{v}{v_S}\left(\frac{\theta}{180} + 2n - 2\right)\cdot Tp \qquad (8)$$

In this embodiment, as described above, $v = (1/2)v_S$, $\theta = 270°$, Tp=29 μm, and n=1 because both the first audio head A1 and the extra audio head EA begin to write tracks on the magnetic tape 10 during a complete rotation of the rotary drum 150. Thus, substituting these value into Eq. (8), we obtain $$h = 7.25\ (\mu m)$$

Figure 16:
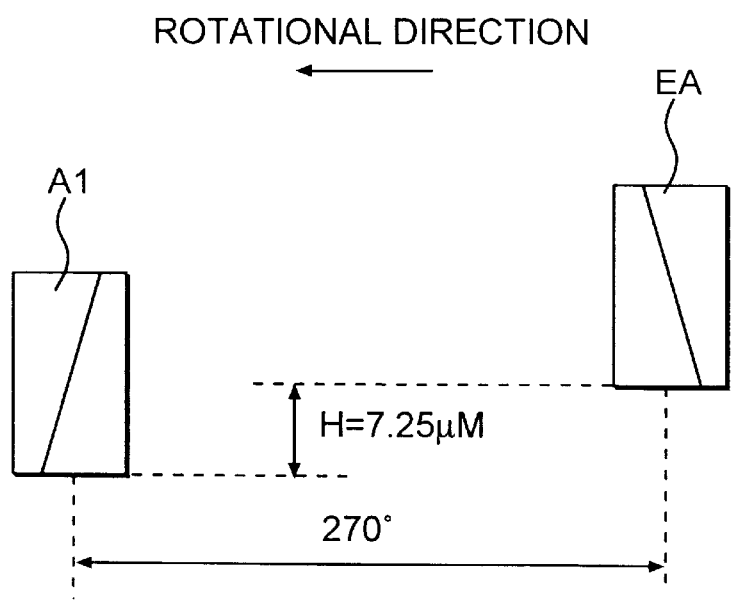
FIG. 16 is a view which shows the positional relation between the audio head A1 and the extra audio head EA shown in FIG. 14.

Therefore, the formation of digital data-recording tracks at the same pitch of 29 μm in the digital normal play mode and the digital long play mode is achieved by mounting the lower edge of the extra audio head EA, as shown in FIG. 16, at a location 7,25 μm higher than the lower edge of the first audio head A1.

A digital data playback operation is achieved only using the first audio head A1 and the extra audio head EA to reproduce the magnetic tape 10 traveling at half the speed in the digital data normal play mode around the rotary drum 150 sptnning at, for example, 30 rps that is identical with that in the digital data recording operation.

As apparent from the above discussion, the tape-to-head speed is the same both in the recording and playback operations so that the audio head A1 and the extra audio head EA move in the playback operation along the same scan paths as those in the recording operation, thereby resulting in a greatly improved error rate which will be caused in the conventional systems by the shift in head path between the recording and playback operations.

The present invention is not limited to the above embodiment. For example, the present invention may be used to record and reproduce digital data for a long period of time that is an even multiple (2m, m=a natural number) of the playing time in the digital normal play mode. In this case, the tape travel speed is 1/(2m) times that in the digital normal play mode. Further, the third embodiment is not limited to the head layout shown in FIG. 14 and may alternatively change the mount locations of the flying-erase head ER and the extra audio head EA. In this case, the extra audio head EA is controlled to start to write a digital data track after a 270° rotation of the rotary drum 150 following completion of writing of a digital data track by the first audio head A1. After a 90° rotation of the rotary drum 150 following the writing of the digital data track by the extra audio head EA, the first audio head A1 starts to write a digital data track again.

In this example, since θ=90°, and n=2 in the above Eq. (8), h=−7.25. Specifically, the formation of digital data-recording tracks at a pitch of 29 μm which is equal to that in the digital normal play mode is achieved by mounting the lower edge of the extra audio head EA at a location 7,25 μm lower than the lower edge of the first audio head A1.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims. For example, the embodiment, as discussed above, all use a 180° helical scan format, but may alternatively use a more than 180° helical scan format.

What is claimed is:

1. A magnetic recording apparatus comprising:

a rotary drum;

first and second rotary heads disposed on said rotary drum at an angular interval of 180° away from each other, said first and second rotary heads having azimuth angles different from each other and writing tracks with alternate helical scans thereof on a magnetic tape traveling at a preselected speed, wrapped around said rotary drum to record digital information signals on the tracks in a normal play mode;

a third rotary head disposed on said rotary drum at an angular interval of θ(θ≠180°) following said first rotary head in a direction of rotation of said rotary drum, said third rotary head having an azimuth angle different from that of said first rotary head; and said first and second rotary heads having a relative height difference h, as shown below, from a preselected a reference plane $$h = Tp - \frac{v}{v_S}\left(\frac{\theta}{180} + 2n - 2\right) \cdot Tp$$

where Tp is a track pitch in the normal play mode, $v_S$ is the travel speed of the magnetic tape in the normal play mode, v is the travel speed of the magnetic tape in a long play mode, and n is a natural number indicating the number of rotations of said rotary drum until both said first and third rotary heads start to write the tracks on the magnetic tape; and a recording circuit, when the long play mode is entered, changing a travel speed of the magnetic speed to 1/2m times (m=a natural number) that in the normal play mode to write tracks with alternate helical scans of said first and third rotary heads on the magnetic tape wrapped around said rotary drum, spinning at the same speed as that in the normal play mode to record digital information signals on the tracks for a period of time of 2m times a recording time in the normal play mode.

2. A magnetic recording apparatus as set forth in claim 1, further comprising a rotary erase head which is disposed on said rotary drum at an angular interval of 180° away from said third rotary head.

3. A magnetic recording/reproduction apparatus comprising:

a rotary drum;

first and second rotary heads disposed on said rotary drum at an angular interval of 180° away from each other, having azimuth angles different from each other, said first and second rotary heads recording and reproducing digital information signals with alternate scans on and from a magnetic tape traveling at a preselected speed, wrapped around said rotary drum spinning at a preselected rotational speed in a normal play mode;

a third rotary head disposed on said rotary drum at an angular interval of θ(θ≠180°) following said first rotary head in a direction of rotation of said rotary drum, said third rotary head having an azimuth angle different from that of said first rotary head; wherein said first and second rotary heads having a relative height difference h, as shown below, from a preselected a reference plane $$h = Tp - \frac{v}{v_S}\left(\frac{\theta}{180} + 2n - 2\right) \cdot Tp$$

where Tp is a track pitch in the normal play mode, $v_S$ is the travel speed of the magnetic tape in the normal play mode, v is the travel speed of the magnetic tape in a long play mode, and n is a natural number indicating the number of rotations of said rotary drum until both said first and third rotary heads start to write the tracks on the magnetic tape;

a recording circuit, when the long play mode is entered, changing a travel speed of the magnetic speed to 1/2m times (m=a natural number) that in the normal play mode to write tracks with alternate helical scans of said first and third rotary heads on the magnetic tape wrapped around said rotary drum spinning at the same speed as that in the normal play mode to record digital information signals on the tracks for a period of time of 2m times a recording time in the normal play mode; and a reproducing circuit, when the long play mode is entered, changing the travel speed of the magnetic speed to 1/2m times (m=a natural number) that in the normal play mode to reproduce the digital information signals recorded on the magnetic tape with alternate helical scans of said first and third rotary heads of said rotary drum spinning at the same speed as that in the normal play mode for the period of time of 2m times a reproducing time in the normal play mode.

4. A magnetic recording/reproducing apparatus as set forth in claim 3, further comprising a rotary erase head which is disposed on said rotary drum at an angular interval of 180° away from said third rotary head.

* * * * *